(12) United States Patent
Hashimoto

(10) Patent No.: US 12,540,217 B2
(45) Date of Patent: Feb. 3, 2026

(54) CATECHOL FUNCTIONAL ORGANOPOLYSILOXANE, METHOD FOR PRODUCING SAME, AND POWDER TREATMENT AGENT

(71) Applicant: Shin-Etsu Chemical Co., Ltd., Tokyo (JP)

(72) Inventor: Ryota Hashimoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 513 days.

(21) Appl. No.: 17/925,489

(22) PCT Filed: May 27, 2021

(86) PCT No.: PCT/JP2021/020143
§ 371 (c)(1),
(2) Date: Nov. 15, 2022

(87) PCT Pub. No.: WO2021/246276
PCT Pub. Date: Dec. 9, 2021

(65) Prior Publication Data
US 2023/0183428 A1 Jun. 15, 2023

(30) Foreign Application Priority Data
Jun. 1, 2020 (JP) .................................. 2020-095227

(51) Int. Cl.
C08G 77/38 (2006.01)
A61K 8/893 (2006.01)
A61Q 17/04 (2006.01)
C08G 77/06 (2006.01)

(52) U.S. Cl.
CPC .............. *C08G 77/38* (2013.01); *A61K 8/893* (2013.01); *A61Q 17/04* (2013.01); *C08G 77/06* (2013.01)

(58) Field of Classification Search
None
See application file for complete search history.

(56) References Cited

U.S. PATENT DOCUMENTS

| | | | |
|---|---|---|---|
| 3,328,450 A | 6/1967 | Plueddemann | |
| 9,303,048 B2 | 4/2016 | Hirokami | |
| 9,464,100 B2 | 10/2016 | Hirokami | |
| 2006/0233728 A1* | 10/2006 | Sagawa | A61K 8/4906 424/59 |

FOREIGN PATENT DOCUMENTS

| | | |
|---|---|---|
| CN | 103613611 A | 3/2014 |
| CN | 111909447 A | 11/2020 |

(Continued)

OTHER PUBLICATIONS

Japanese Office Action for corresponding Japanese Application No. 2020-095227, dated Mar. 14, 2023, with English translation.

(Continued)

*Primary Examiner* — Nannette Holloman
(74) *Attorney, Agent, or Firm* — Birch, Stewart, Kolasch & Birch, LLP

(57) ABSTRACT

Provided are an organopolysiloxane having a catechol structure per each molecule; and a powder treatment agent that is comprised of such organopolysiloxane. The organopolysiloxane is a catechol functional organopolysiloxane represented by the following formula (1):

[Chemical formula 1]

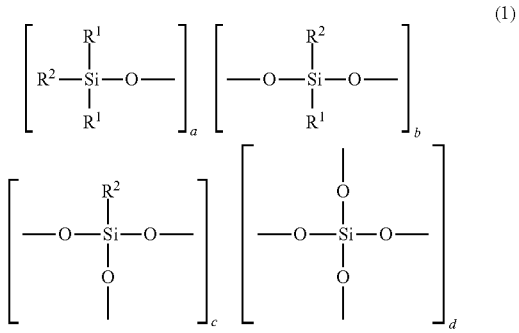

wherein each $R^1$ independently represents a substituted or unsubstituted monovalent hydrocarbon group having 1 to 6 carbon atoms; each $R^2$ independently represents a substituted or unsubstituted monovalent hydrocarbon group having 1 to 6 carbon atoms, or a substituent group represented by a formula (2); a, b, c and d each represent 0 or a positive number, and satisfy $a+b+c+d=2$ to 1,000; in each molecule, at least one $R^2$ is the substituent group represented by the formula (2) being expressed as:

[Chemical formula 2]

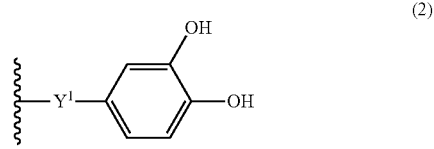

wherein $Y^1$ represents a substituted or unsubstituted divalent hydrocarbon group having 2 to 6 carbon atoms.

14 Claims, No Drawings

(56) References Cited

FOREIGN PATENT DOCUMENTS

| | | |
|---|---|---|
| FR | 2 964 864 A1 | 3/2012 |
| JP | 7-53326 A | 2/1995 |
| JP | 7-196946 A | 8/1995 |
| JP | 2006-182949 A | 7/2006 |
| JP | 2015-182977 A | 10/2015 |
| KR | 20110044685 A * | 3/2010 |
| KR | 10-2011-0044685 A | 4/2011 |

OTHER PUBLICATIONS

Moon et al., "Adhesion Behavior of Catechol-Incorporated Silicone Elastomer on Metal Surface," ACS Applied Polymer Materials, vol. 2, 2020, pp. 2444-2451.
Supplementary European Search Report for European Application No. 21818320.0, dated Jun. 17, 2024.
International Search Report for PCT/JP2021/020143 (PCT/ISA/210) mailed on Aug. 17, 2021.
Written Opinion of the International Searching Authority for PCT/JP2021/020143 (PCT/ISA/237) mailed on Aug. 17, 2021.

* cited by examiner

CATECHOL FUNCTIONAL ORGANOPOLYSILOXANE, METHOD FOR PRODUCING SAME, AND POWDER TREATMENT AGENT

TECHNICAL FIELD

The present invention relates to a catechol functional organopolysiloxane; a method for producing the same; and a powder treatment agent containing such catechol functional organopolysiloxane.

BACKGROUND ART

In general, it is difficult to disperse a powder into a liquid in a stable and highly concentrated manner; agglomeration occurs due to the charge and polarity of the powder as well as a small amount of impurities, whereby dispersibility and stability of the powder are impaired. For example, in the case of a dispersion containing a pigment comprised of fine particles, a significant increase in viscosity thereof is observed with time, which not only makes it difficult to for example transport the product thereof, but may also make it difficult to use the same as gelation takes place.

As a method for improving the dispersion stability of a powder, there may be employed, for example, mixing with the aid of a mechanical force such as that brought by a homomixer, a mill, a kneader or a roller. However, there are limitations to a dispersion that is triggered only by a mechanical force(s); there are many cases where agglomeration occurs with time even though the powder has once uniformly dispersed.

In this regard, in order to improve the dispersibility and stability of a powder, proposals have been made on treating the surface of a powder with various polymer materials. Such polymer material is structured in such a manner that it has both a moiety adsorbable to a powder, and a moiety having a high affinity for a solvent as a dispersion medium; the performance of a polymer material is determined by a balance between these two functional moieties.

In the field of cosmetic materials, there are many cases where an organopolysiloxane having a reacting site(s) in each molecule is used as a polymer material for treating the surface of a powder. In most of these cases, it is designed in such a manner that a chemical bond is to be established between this organopolysiloxane and the surface of a powder, and that the organopolysiloxane shall not be easily eliminated from the powder surface over time even after it was used in various compounding systems.

Patent document 1 discloses a method for surface-treating powders with methylhydrogenpolysiloxane. However, this method has a problem such as one where since unreacted hydrosilyl groups will remain in a powder even after the surface treatment, a hydrogen gas will be generated as a result of adding such powder to a liquid cosmetic material, though depending on a condition(s) thereof.

Patent document 2 discloses a method for surface-treating powders with a linear one-end alkoxy-modified organopolysiloxane. This method has a problem where since an alcohol compound will be generated as a byproduct at the time of reaction, there may be required an additional step for removing such alcohol compound, though depending on the procedure employed.

Meanwhile, in contrast to these organopolysiloxanes forming covalent bonds with powder surfaces, an organopolysiloxane with a modified alcoholic hydroxyl group and phenolic hydroxyl group is a treatment agent targeted at adsorption to a powder via hydrogen bonding, and has a merit of not producing a byproduct or the like; however, such organopolysiloxane has often exhibited a problem that an insufficient adsorbability to a powder surface may be exhibited whereby the organopolysiloxane may be eliminated from the powder surface over time. Thus, desired is the development of an organopolysiloxane having a functional group(s) improving adsorbability to powder surfaces.

In recent years, studies are being actively conducted on catechol structure-containing compounds, aiming at the development of an application(s) to an adhesive agent or the like. A catechol structure is known to have a variety of interaction effects such as hydrogen bonding, coordination to metals, and π-π interaction; these interactions contribute to a strong adhesion/adsorption to various kinds of materials.

Patent document 3 discloses a method where a catechol structure-containing silane compound is used as an adhesive agent for glass fibers and epoxy resins. However, there have never been known a catechol structure-containing organopolysiloxane, and an application example using the same.

PRIOR ART DOCUMENTS

Patent Documents

Patent document 1: JP-A-Hei 7-53326
Patent document 2: JP-A-Hei 7-196946
Patent document 3: JP-A-2015-182977

SUMMARY OF THE INVENTION

Problems to be Solved by the Invention

Thus, it is an object of the present invention to provide an organopolysiloxane having a catechol structure per each molecule; and a powder treatment agent that is comprised of such organopolysiloxane, and is capable of being used to produce a dispersion superior in dispersibility, fluidity and temporal stability.

Means to Solve the Problems

The inventor of the present invention diligently conducted a series of studies to achieve the above object, and completed the invention as follows. That is, the inventor of the present invention found that the abovementioned problems can be solved by an organopolysiloxane having a catechol structure per each molecule (catechol functional organopolysiloxane).

Specifically, the present invention is to provide the following invention.

[1]

A catechol functional organopolysiloxane represented by the following formula (1):

[Chemical formula 1]

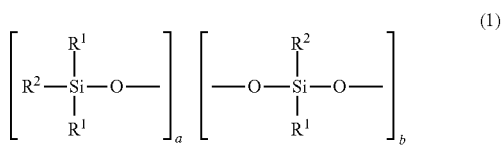

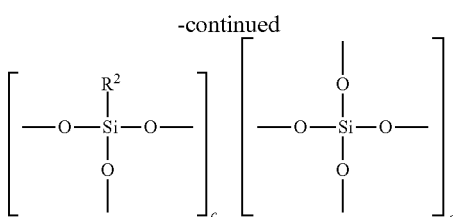

wherein each $R^1$ independently represents a substituted or unsubstituted monovalent hydrocarbon group having 1 to 6 carbon atoms; each $R^2$ independently represents a substituted or unsubstituted monovalent hydrocarbon group having 1 to 6 carbon atoms, or a substituent group represented by a formula (2); a, b, c and d each represent 0 or a positive number, and satisfy a+b+c+d=2 to 1,000; in each molecule, at least one $R^2$ is the substituent group represented by the formula (2); and oxygen atom(s) in each repeating unit are shared with the rest of the repeating units, the formula (2) being expressed as:

[Chemical formula 2]

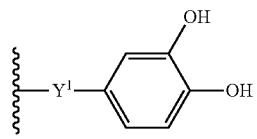

(2)

wherein $Y^1$ represents a substituted or unsubstituted divalent hydrocarbon group having 2 to 6 carbon atoms; and a bond delimited by a wavy line is to be bonded to a silicon atom in the formula (1).

[2]
The catechol functional organopolysiloxane according to [1], wherein in the formula (1), a=2, b=0 to 1,000, c=0, and d=0.

[3]
A method for producing the catechol functional organopolysiloxane according to [1] or [2], comprising a step of subjecting an organohydrogenpolysiloxane represented by a formula (3) and an unsaturated compound represented by a formula (4) to a hydrosilylation reaction, the formulae (3) and (4) being expressed as:

[Chemical formula 3]

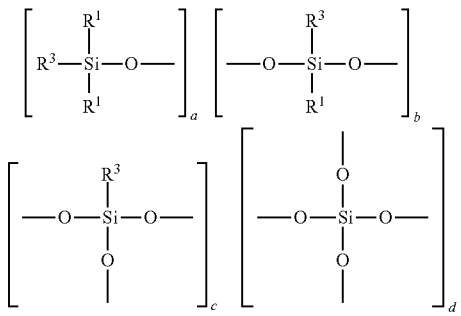

(3)

wherein each $R^1$ independently represents a substituted or unsubstituted monovalent hydrocarbon group having 1 to 6 carbon atoms; each $R^3$ independently represents a hydrogen atom, or a substituted or unsubstituted monovalent hydrocarbon group having 1 to 6 carbon atoms; a, b, c and d each represent 0 or a positive number, and satisfy a+b+c+d=2 to 1,000; in each molecule, at least one $R^3$ is a hydrogen atom; and oxygen atom(s) in each repeating unit are shared with the rest of the repeating units,

[Chemical formula 4]

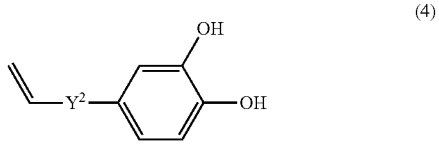

(4)

wherein $Y^2$ represents a single bond, or a substituted or unsubstituted divalent hydrocarbon group having 1 to 4 carbon atoms.

[4]
A powder treatment agent comprising the catechol functional organopolysiloxane according to [1] or [2].

[5]
A dispersion wherein a powder and the powder treatment agent according to [4] are dispersed in an oil agent.

[6]
A cosmetic material composition comprising the dispersion according to [5].

Effects of the Invention

The present invention is an organopolysiloxane having a catechol structure per each molecule (catechol functional organopolysiloxane). In the case of a powder treatment agent containing such organopolysiloxane, the two hydroxyl groups and the aromatic ring in the catechol group of the organopolysiloxane shall strongly interact with a powder surface, and a compatibility of the organopolysiloxane to an oil agent as a dispersion medium shall be improved, whereby powder agglomeration can be prevented, and there can thus be obtained a dispersion superior in dispersibility, fluidity and temporal stability.

MODE FOR CARRYING OUT THE INVENTION

The present invention is described in detail hereunder.
The catechol functional organopolysiloxane of the present invention is a catechol functional organopolysiloxane represented by the following formula (1).

[Chemical formula 5]

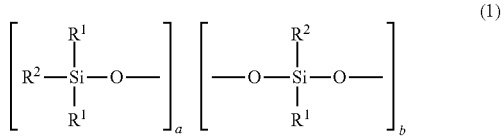

(1)

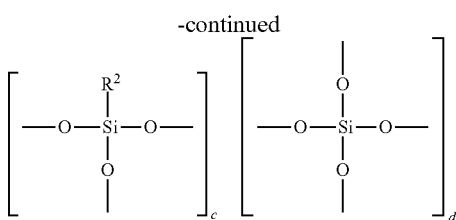

(In the formula (1), each $R^1$ independently represents a substituted or unsubstituted monovalent hydrocarbon group having 1 to 6 carbon atoms; each $R^2$ independently represents a substituted or unsubstituted monovalent hydrocarbon group having 1 to 6 carbon atoms, or a substituent group represented by the following formula (2); a, b, c and d each represent 0 or a positive number, and satisfy a+b+c+d=2 to 1,000. Here, in each molecule, at least one $R^2$ is the substituent group represented by the formula (2). The oxygen atom(s) in each repeating unit in the formula (1) are shared with the rest of the repeating units.)

[Chemical formula 6]

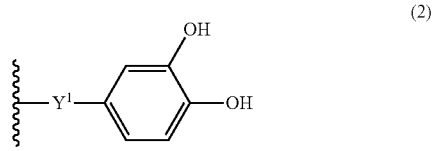

(In the formula (2), $Y^1$ represents a substituted or unsubstituted divalent hydrocarbon group having 2 to 6 carbon atoms. In the formula (2), a bond delimited by a wavy line is to be bonded to a silicon atom in the formula (1).)

In the formula (1), each $R^1$ independently represents a substituted or unsubstituted monovalent hydrocarbon group having 1 to 6 carbon atoms. Examples of such $R^1$ include unsubstituted monovalent hydrocarbon groups which are, for example, an alkyl group such as a methyl group, an ethyl group, a propyl group, an isopropyl group, a butyl group, an isobutyl group and a hexyl group; a cycloalkyl group such as a cyclohexyl group; an alkenyl group such as a vinyl group, an allyl group and a propenyl group; and an aryl group such as a phenyl group, where other examples of such $R^1$ may include monovalent hydrocarbon groups obtained by substituting part of or all the hydrogen atoms bonded to the carbon atoms in any of the above hydrocarbon groups with a hydroxy group, a halogen atom or the like (e.g. hydroxypropyl group, 1-chloropropyl group, 3,3,3-trifluoropropyl group).

In the formula (1), $R^2$ represents a substituted or unsubstituted monovalent hydrocarbon group similar to that of $R^1$, or the catechol functional substituent group represented by the formula (2), where in each molecule, at least one $R^2$ is the substituent group represented by the formula (2).

In the formula (1), while a, b, c and d may be selected in such a manner that a, b, c and d each represent 0 or a positive number and satisfy a+b+c+d=2 to 1,000, it is preferred that a, b, c and d are such that a=2, b=0 to 1,000, c=0 and d=0, more preferably a=2, b=0 to 100, c=0 and d=0.

In terms of property, it is preferred that the catechol functional organopolysiloxane of the present invention be a liquid and have a low viscosity, because such property makes handling easy.

In the formula (2), $Y^1$ represents a substituted or unsubstituted divalent hydrocarbon group having 2 to 6 carbon atoms. Examples of such $Y^1$ include unsubstituted divalent hydrocarbon groups which are, for example, alkylene groups such as an ethylene group, a propylene group, an isopropylene group, a butylene group, an isobutylene group, a pentylene group and a hexylene group; and substituted divalent hydrocarbon groups with an ether bond or a carbonyl bond being present therein.

There are no particular restrictions on the quantity of functional groups so long as each molecule contains at least one catechol group represented by the formula (2); in order to maintain an adherability to a powder, it is preferred that the quantity of functional groups be 200 to 1,000 g/mol, more preferably 200 to 5,000 g/mol.

There are no particular restrictions on a weight-average molecular weight of the catechol functional organopolysiloxane of the present invention; it is preferred that this weight-average molecular weight be 200 to 100,000, more preferably 500 to 10,000, as the organopolysiloxane shall be able to be handled easily if it has a property of being a liquid and having a low viscosity.

Here, in this specification, the weight-average molecular weight is a value obtained via a GPC (gel permeation chromatography) analysis performed under the following conditions, and with polystyrene being used as a reference substance.

[Measurement Conditions]
Developing solvent: Tetrahydrofuran (THF)
Flow rate: 0.6 mL/min
Detector: Differential refractive index detector (RI)
Column: TSK Guardcolumn Super H-H
TSK gel Super HM-N (6.0 mm I.D.×15 cm×1)
TSK gel Super H2500 (6.0 mm I.D.×15 cm×1)
(All manufactured by Tosoh Corporation)
Column temperature: 40° C.
Sample injection volume: 50 μL (THF solution with a concentration of 0.3% by weight)

Production Method

The catechol functional organopolysiloxane of the present invention (formula (1)) is produced by the following method.

Specifically, the catechol functional organopolysiloxane of the present invention (formula (1)) can be produced by subjecting an organohydrogenpolysiloxane represented by the following formula (3) and an unsaturated compound represented by the following formula (4) to a hydrosilylation reaction.

[Chemical formula 7]

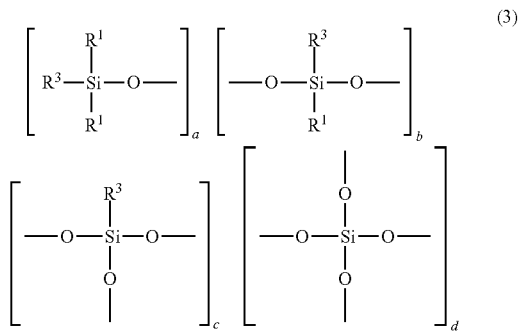

(In the formula (3), each $R^1$ independently represents a substituted or unsubstituted monovalent hydrocarbon group having 1 to 6 carbon atoms; each $R^3$ independently represents a hydrogen atom, or a substituted or unsubstituted monovalent hydrocarbon group having 1 to 6 carbon atoms; a, b, c and d each represent 0 or a positive number, and satisfy a+b+c+d=2 to 1,000. Here, in each molecule, at least one $R^3$ is a hydrogen atom. The oxygen atom(s) in each repeating unit in the formula (3) are shared with the rest of the repeating units.)

[Chemical formula 8]

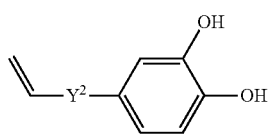

(4)

(In the formula (4), $Y^2$ represents a single bond, or a substituted or unsubstituted divalent hydrocarbon group having 1 to 4 carbon atoms.)

In the formula (3), each $R^1$ independently represents a substituted or unsubstituted monovalent hydrocarbon group having 1 to 6 carbon atoms. Examples of such $R^1$ include unsubstituted monovalent hydrocarbon groups which are, for example, an alkyl group such as a methyl group, an ethyl group, a propyl group, an isopropyl group, a butyl group, an isobutyl group and a hexyl group; a cycloalkyl group such as a cyclohexyl group; an alkenyl group such as a vinyl group, an allyl group and a propenyl group; and an aryl group such as a phenyl group, where other examples of such $R^1$ may include monovalent hydrocarbon groups obtained by substituting part of or all the hydrogen atoms bonded to the carbon atoms in any of the above hydrocarbon groups with a hydroxy group, a halogen atom or the like (e.g. hydroxypropyl group, 1-chloropropyl group, 3,3,3-trifluoropropyl group).

In the formula (3), each $R^3$ independently represents a hydrogen atom, or a substituted or unsubstituted monovalent hydrocarbon group having 1 to 6 carbon atoms, where in each molecule, at least one $R^3$ is a hydrogen atom. Examples of such $R^3$ include a hydrogen atom, or unsubstituted monovalent hydrocarbon groups which are, for example, an alkyl group such as a methyl group, an ethyl group, a propyl group, an isopropyl group, a butyl group, an isobutyl group and a hexyl group; a cycloalkyl group such as a cyclohexyl group; an alkenyl group such as a vinyl group, an allyl group and a propenyl group; and an aryl group such as a phenyl group, where other examples of such $R^1$ may include monovalent hydrocarbon groups obtained by substituting part of or all the hydrogen atoms bonded to the carbon atoms in any of the above hydrocarbon groups with a hydroxy group, a halogen atom or the like (e.g. hydroxypropyl group, 1-chloropropyl group, 3,3,3-trifluoropropyl group).

In the formula (3), while a, b, c and d may be selected in such a manner that a, b, c and d each represent 0 or a positive number and satisfy a+b+c+d=2 to 1,000, it is preferred that a, b, c and d are such that a=2, b=0 to 1,000, c=0 and d=0, more preferably a=2, b=0 to 100, c=0 and d=0.

In terms of property, it is preferred that the organohydrogenpolysiloxane represented by the formula (3) be a liquid and have a low viscosity, because such property makes handling easy.

In the formula (4), $Y^2$ represents a single bond, or a substituted or unsubstituted divalent hydrocarbon group having 1 to 4 carbon atoms. Examples of such $Y^2$ include unsubstituted divalent hydrocarbon groups which are, for example, alkylene groups such as a methylene group, an ethylene group, a propylene group, an isopropylene group, a butylene group and an isobutylene group; and substituted divalent hydrocarbon groups with an ether bond or a carbonyl bond being present therein.

A platinum group metal-based catalyst may be used in the hydrosilylation reaction between the organohydrogenpolysiloxane represented by the formula (3) and the unsaturated compound represented by the formula (4). Examples of such platinum group metal-based catalyst include a platinum-based catalyst, a palladium-based catalyst, a rhodium-based catalyst and a ruthenium-based catalyst, among which a platinum-based catalyst is particularly preferred. Examples of such platinum-based catalyst include chloroplatinic acid, an alcohol or aldehyde solution of chloroplatinic acid, various olefins of chloroplatinic acid, or a complex of chloroplatinic acid and vinylsiloxane. These platinum group metal-based catalysts are added in a catalytic amount; the catalyst may be added in an amount of 1 to 50 ppm, preferably 2 to 20 ppm, in terms of platinum-group metal atoms per the total mass of the composition.

Here, as for a compounding ratio between the organohydrogenpolysiloxane represented by the formula (3) and the unsaturated compound represented by the formula (4), it is preferred that such ratio be a one where the unsaturated groups in the unsaturated compound represented by the formula (4) are in an amount of 0.8 to 2 mol, more preferably 0.9 to 1.3 mol, per 1 mol of the SiH groups in the organohydrogenpolysiloxane represented by the formula (3).

There are no particular restrictions on a temperature and time for performing the hydrosilylation reaction. It will suffice if the organohydrogenpolysiloxane represented by the formula (3) and the unsaturated compound represented by the formula (4) are able to be fully reacted with each other; a reaction temperature is preferably 60 to 140° C., more preferably 80 to 120° C., and a reaction time is preferably 0.5 to 12 hours, more preferably 1 to 6 hours.

If necessary, the hydrosilylation reaction may be performed in a solvent. There are no particular restrictions on the kind of the solvent, specific examples of which may include an aromatic hydrocarbon solvent such as toluene and xylene; an aliphatic hydrocarbon solvent such as hexane, octane and isoparaffin; an ether type solvent such as diisopropyl ether and 1,4-dioxane; and mixed solvents of these solvents. Among the above examples, particularly preferred are an aromatic hydrocarbon solvent such as toluene and xylene; and an aliphatic hydrocarbon solvent such as hexane, octane and isoparaffin.

Dispersion

The catechol functional organopolysiloxane of the present invention is favorably used at the time of dispersing a powder into an oil agent; by treating the powder with this organopolysiloxane, there can be obtained a dispersion capable of being uniformly and stably dispersed in an oil agent.

There are no particular restrictions on the powder to be used in the dispersion; as such powder, there may be listed an inorganic powder, an organic powder, a surfactant metal salt powder, a colored pigment, a pearl pigment and a tar pigment that are generally used.

Specific examples of the inorganic powder include titanium oxide, zirconium oxide, zinc oxide, cerium oxide, magnesium oxide, barium sulfate, calcium sulfate, magnesium sulfate, calcium carbonate, magnesium carbonate, talc, mica, kaolin, sericite, white mica, synthetic mica, gold mica, red mica, black mica, lithia mica, silicic acid, silicic acid anhydride, aluminum silicate, magnesium silicate, aluminum magnesium silicate, calcium silicate, barium silicate, strontium silicate, metal tungstate, hydroxyapatite, vermiculite, hydrargilite, bentonite, montmorillonite, hectorite, zeolite, ceramic powder, dicalcium phosphate, alumina, aluminum hydroxide, boron nitride, boron nitride, silica, silylated silica and hydrophobized silica. Any one kind of these inorganic powders may be used alone, or two or more kinds of them may be used in combination.

Specific examples of the organic powder include a polyamide powder, a polyacrylic acid-acrylic acid ester powder, a polyester powder, a polyethylene powder, a polypropylene powder, a polystyrene powder, a polyurethane powder, a benzoguanamine powder, a polymethyl benzoguanamine powder, a tetrafluoroethylene powder, a polymethylmethacrylate powder, a cellulose powder, a silk powder, a 12 nylon powder, and a 6 nylon powder; a crosslinked spherical dimethylpolysiloxane fine powder having a structure where dimethylpolysiloxane is crosslinked, a crosslinked spherical polymethylsilsesquioxane fine powder, and a fine powder prepared by coating the surface of a crosslinked spherical organopolysiloxane rubber with polymethylsilsesquioxane particles; powders of a styrene-acrylic acid copolymer, a divinylbenzene-styrene copolymer, a vinyl resin, a urea resin, a phenolic resin, a fluorine resin, a silicon resin, an acrylic resin, a melamine resin, an epoxy resin, and a polycarbonate resin; and a microcrystalline fiber powder, a starch powder, a fatty acid starch derivative powder, and a lauroyl lysine powder. Any one kind of these organic powders may be used alone, or two or more kinds of them may be used in combination.

Specific examples of the surfactant metal salt powder (metallic soap) include zinc undecylenate, aluminum isostearate, zinc stearate, aluminum stearate, calcium stearate, magnesium stearate, zinc myristate, magnesium myristate, zinc cetyl phosphate, calcium cetyl phosphate, sodium zinc cetyl phosphate, zinc palmitate, aluminum palmitate and zinc laurate. Any one kind of these surfactant metal salt powders may be used alone, or two or more kinds of them may be used in combination.

Specific examples of the colored pigment include an inorganic red pigment such as iron oxide, iron hydroxide and iron titanate; an inorganic brown pigment such as γ-iron oxide; an inorganic yellow pigment such as yellow iron oxide and loess; an inorganic black pigment such as black iron oxide and carbon black; an inorganic purple pigment such as manganese violet and cobalt violet; an inorganic green pigment such as chromium hydroxide, chromium oxide, cobalt oxide and cobalt titanate; an inorganic blue pigment such as Prussian blue and ultramarine; a tar-based pigment that has been turned into a lake pigment; a natural pigment that has been turned into a lake pigment; and synthetic resin powders prepared by compounding these powders. Specific examples of such natural pigment include carminic acid, laccaic acid, carthamin, brazilin and crocin. Any one kind of these colored pigments may be used alone, or two or more kinds of them may be used in combination.

Specific examples of the pearl pigment include titanium oxide-coated mica, titanium oxide-coated mica, bismuth oxychloride, titanium oxide-coated bismuth oxychloride, titanium oxide-coated talc, fish scale foil and titanium oxide-coated colored mica. Any one kind of these pearl pigments may be used alone, or two or more kinds of them may be used in combination.

Specific examples of the tar pigment include red No. 3, red No. 104, red No. 106, red No. 201, red No. 202, red No. 204, red No. 205, red No. 220, red No. 226, red No. 227, red No. 228, red No. 230, red No. 401, red No. 505; yellow No. 4, yellow No. 5, yellow No. 202, yellow No. 203, yellow No. 204, yellow No. 401; blue No. 1, blue No. 2, blue No. 201, blue No. 404; green No. 3, green No. 201, green No. 204, green No. 205; orange No. 201, orange No. 203, orange No. 204, orange No. 206, orange No. 207. Any one kind of these tar pigments may be used alone, or two or more kinds of them may be used in combination.

Among these powders, particularly preferred are a crosslinked spherical dimethylpolysiloxane fine powder having a structure with dimethylpolysiloxane crosslinked; a crosslinked spherical polymethylsilsesquioxane fine powder; a fine powder prepared by coating the surface of a crosslinked spherical organopolysiloxane rubber with polymethylsilsesquioxane particles; and a hydrophobized silica.

As a commercially available product(s) of these powders, there may be listed, for example, KMP-590, KSP-100, KSP-101, KSP-102, KSP-105, and KSP-300 (all produced by Shin-Etsu Chemical Co., Ltd.).

As for these powders, there may also be used a compounded powder and a previously surface-treated powder, on the premise that the effects of the present invention will not be impaired. The powder may or may not be previously surface treated via, for example, a silicone compound treatment, a fluorine compound treatment, a silane coupling agent treatment, a titanium coupling agent treatment, an N-acylated lysine treatment, a polyacrylic acid treatment, an amino acid treatment, a plasma treatment or a mechanochemical treatment. Where appropriate, one such powder may be used alone, or two or more kinds thereof may be used together.

There are also no particular restrictions on the oil agent for dispersing the dispersion, and any oil agent may be used. Examples of such oil agent include a non-polar oil such as a hydrocarbon oil; a polar oil such as a higher fatty acid, an ester oil and a natural animal or vegetable oil; a semisynthetic oil; a silicone oil; and a fluorine-based oil. Among these examples, a polar oil and a silicone oil are preferred. Moreover, the oil agent may be that consisting of one or more kinds of ester oils and natural animal or vegetable oils; and one or more kinds of silicone oils. As such, even when the oil agent is that consisting of a relatively highly polar ester oil(s) and natural animal or vegetable oil(s); and a relatively low polar silicone oil(s), so long as the catechol functional organopolysiloxane of the present invention is employed, there can be provided a dispersion superior in dispersibility, fluidity and temporal stability by treating the powder with the catechol functional organopolysiloxane of the present invention, as the catechol functional organopolysiloxane of the present invention is compatible with any of these oils.

Specific examples of the silicone oil include organopolysiloxanes such as dimethylpolysiloxane, caprylyl methicone, phenyl trimethicone, methylphenylpolysiloxane, methylhexylpolysiloxane, methylhydrogenpolysiloxane, and a dimethylsiloxane-methylphenylsiloxane copolymer; modified organopolysiloxanes including, for example, an amino-modified organopolysiloxane, a higher alkoxy-modified organopolysiloxane such as stearoxy silicone, a higher fatty acid-modified organopolysiloxane, an alkyl-modified organopolysiloxane, a long-chain alkyl-modified organopolysiloxane, and a fluorine-modified organopolysiloxane; a gum-like matter obtained by polymerizing any of the above organopolysiloxanes and modified organopolysiloxanes at a high polymerization degree; cyclic organopolysiloxanes such as octamethylcyclotetrasiloxane, decamethylcyclopentasiloxane, dodecamethylcyclohexasiloxane, tetramethyltetrahydrogencyclotetrasiloxane, and tetramethyltetraphenylcyclotetrasiloxane; and a dissolved matter obtained by dissolving a silicone resin or a silicone resin with any of the above organopolysiloxanes and cyclic organopolysiloxanes. These silicone oils may be linear or branched. Further, any one kind of these silicone oils may be used alone, or two or more kinds of them may be used in combination.

Specific examples of the hydrocarbon oil include an ozokerite, α-olefin oligomer, light isoparaffin, isododecane, light liquid isoparaffin, squalane, synthetic squalane, vegetable squalane, squalene, ceresin, paraffin, paraffin wax, polyethylene wax, polyethylene-polypropylene wax, (ethylene/propylene/styrene)copolymer, (butylene/propylene/styrene)copolymer, liquid paraffin, liquid isoparaffin, pristane, polyisobutylene, hydrogenated polyisobutene, microcrystalline wax, and vaseline. These hydrocarbon oils may be linear or branched. Further, any one kind of these hydrocarbon oils may be used alone, or two or more kinds of them may be used in combination.

Specific examples of the higher fatty acid include lauric acid, myristic acid, palmitic acid, stearic acid, behenic acid, undecylenic acid, oleic acid, linoleic acid, linolenic acid, arachidonic acid, eicosapentaenoic acid (EPA), docosahexaenoic acid (DHA), isostearic acid, and 12-hydroxystearic acid. These higher fatty acids may be linear or branched. Further, any one kind of these higher fatty acids may be used alone, or two or more kinds of them may be used in combination.

Specific examples of the ester oil include diisobutyl adipate, 2-hexyldecyl adipate, di-2-heptylundecyl adipate, N-alkyl glycol monoisostearate, isocetyl isostearate, trimethylolpropane triisostearate, ethylene glycol di-2-ethylhexanoate, cetyl 2-ethylhexanoate, trimethylolpropane tri-2-ethylhexanoate, pentaerythritol tetra-2-ethylhexanoate, cetyl octanoate, octyldodecyl gum ester, oleyl oleate, octyldodecyl oleate, decyl oleate, neopentyl glycol dioctanoate, neopentyl glycol dicaprate, triethyl citrate, 2-ethylhexyl succinate, amyl acetate, ethyl acetate, butyl acetate, isocetyl stearate, butyl stearate, diisopropyl sebacate, di ethylhexyl sebacate, cetyl lactate, myristyl lactate, isononyl isononanoate, isotridecyl isononanoate, isopropyl palmitate, 2-ethylhexyl palmitate, 2-hexyldecyl palmitate, 2-heptylundecyl palmitate, cholesteryl 12-hydroxystearate, dipentaerythritol fatty acid ester, isopropyl myristate, octyldodecyl myristate, 2-hexyldecyl myristate, myristyl myristate, hexyldecyl dimethyloctanoate, ethyl laurate, hexyl laurate, N-lauroyl-L-glutamic acid-2-octyldodecyl ester, lauroyl sarcosine isopropyl ester, and diisostearyl malate. These ester oils may be linear or branched. Further, any one kind of these ester oils may be used alone, or two or more kinds of them may be used in combination.

Specific examples of the natural animal or vegetable oil and the semisynthetic oil include an avocado oil, linseed oil, almond oil, insect wax, perilla oil, olive oil, cacao butter, kapok wax, kaya oil, carnauba wax, liver oil, candelilla wax, refined candelilla wax, beef tallow, beef foot fat, beef bone fat, hardened beef tallow, apricot kernel oil, whale wax, hardened oil, wheat germ oil, sesame oil, rice germ oil, rice bran oil, sugar cane wax, sasanqua oil, safflower oil, shea butter, Chinese wood oil, cinnamon oil, jojoba wax, squalane, squalene, shellac wax, turtle oil, soybean oil, tea seed oil, camellia oil, evening primrose oil, corn oil, lard, rapeseed oil, Japanese wood oil, bran wax, germ oil, horse fat, persic oil, palm oil, palm kernel oil, castor oil, hardened castor oil, castor oil fatty acid methyl ester, sunflower oil, grape oil, bayberry wax, jojoba oil, hydrogenated jojoba oil, macadamia nut oil, beeswax, mink oil, meadowfoam oil, cottonseed oil, cotton wax, Japan wax, Japan wax kernel oil, montan wax, coconut oil, hardened coconut oil, tri-coconut oil fatty acid glyceride, mutton tallow, peanut oil, lanolin, liquid lanolin, reduced lanolin, lanolin alcohol, hard lanolin, lanolin acetate, lanolin alcohol acetate, lanolin fatty acid isopropyl, POE lanolin alcohol ether, POE lanolin alcohol acetate, lanolin fatty acid polyethylene glycol, POE hydrogenated lanolin alcohol ether, and egg-yolk oil. Here, POE means polyoxyethylene. These natural animal or vegetable oils and semisynthetic oils may be linear or branched. Further, any one kind of these natural animal or vegetable oils and semisynthetic oils may be used alone, or two or more kinds of them may be used in combination.

Examples of the fluorine-based oil include perfluoropolyether, perfluorodecalin, and perfluorooctane. These fluorine-based oils may be linear or branched. Further, any one kind of these fluorine-based oils may be used alone, or two or more kinds of them may be used in combination.

Powder Treatment Agent

If using the catechol functional organopolysiloxane of the present invention as a powder treatment agent, a powder surface can be treated with the powder treatment agent via a known treatment method.

As one embodiment of such powder treatment agent, the organopolysiloxane may be used alone, or other components may be added thereto before use.

Specific examples of other components may include an organic solvent used to dilute the organopolysiloxane so as to improve its handling property; and a catalyst used to promote the reaction between the two hydroxyl groups in the catechol group of the organopolysiloxane and the functional groups on powder surface.

Specific examples of the organic solvent include aromatic hydrocarbons such as toluene and xylene; saturated hydrocarbons such as n-hexane, n-heptane and cyclohexane; ketones such as acetone, methylethylketone and methylisobutylketone; esters such as ethyl acetate and butyl acetate; ethers such as tetrahydrofuran and dibutyl ether; and siloxanes such as hexamethyldisiloxane and octamethylcyclotetrasiloxane.

Specific examples of the catalyst include inorganic acids such as hydrochloric acid and sulfuric acid; organic acids such as acetic acid, methanesulfonic acid and trifluoromethanesulfonic acid; and metal alkoxides such as alkoxides of titanium and tin.

As the known treatment method, there may be specifically listed, for example, a method where a target powder is to be treated by being dispersed into a powder treatment agent-containing water or organic solvent; and a method where a powder is to be treated with a crusher such as a ball mill or a jet mill after mixing the powder and a powder treatment agent.

Further, in the present invention, an in-oil powder dispersion may be obtained by dispersing into an oil agent a powder treated with the powder treatment agent of the present invention; or by dissolving or dispersing the powder treatment agent of the present invention into an oil agent, and then adding a powder thereinto before performing a mixing and dispersion treatment.

This in-oil powder dispersion may for example be appropriately prepared by the following known preparation method.

As such known preparation method, there may be listed, for example, a method where a powder that has been surface treated in the above manner is to be added and dispersed into an oil agent such as an ester oil or a silicone oil; and a method where the powder treatment agent of the present invention is to be dissolved or dispersed into an oil agent in the above manner, followed by adding a powder thereinto before mixing them with a dispersing machine such as a ball mill, a bead mill or a sand mill.

If using the powder treatment agent of the present invention to treat a powder, it is preferred that this powder treatment agent be used in an amount of 0.1 to 30 parts by mass, more preferably 0.5 to 10 parts by mass, per 100 parts by mass of the powder.

A dispersion obtained by dispersing a powder into an oil agent, using the catechol functional organopolysiloxane of the present invention as a powder treatment agent, can be utilized for various purposes. These purposes include, for example, cosmetic materials, coating materials and inks. As a production method thereof, a cosmetic material composition, a coating material composition, an ink composition and the like may be produced by mixing the dispersion with various kinds of components that are used for the production of a cosmetic material, a coating material, an ink material and the like.

In the cosmetic material composition, it is preferred that the dispersion of the present invention be contained by an amount of 0.1 to 50% by mass, more preferably 1 to 40% by mass, even more preferably 5 to 30% by mass.

WORKING EXAMPLES

The present invention is described in greater detail hereunder with reference to working examples; the present invention shall not be limited to these working examples.

A hydrosilyl group amount mentioned below is a value quantified from the amount of a hydrogen gas generated as a result of subjecting a sample to a NaOH aqueous solution treatment.

A weight-average molecular weight is a value obtained via a GPC (gel permeation chromatography) analysis that is conducted under the following conditions, using polystyrene as a reference substance.

[Measurement Conditions]
Developing solvent: Tetrahydrofuran (THF)
Flow rate: 0.6 mL/min
Detector: Differential refractive index detector (RI)
Column: TSK Guardcolumn Super H-H
TSK gel Super HM-N (6.0 mm I.D.×15 cm×1)
TSK gel Super H2500 (6.0 mm I.D.×15 cm×1)
(All manufactured by Tosoh Corporation)
Column temperature: 40° C.
Sample injection volume: 50 μL (THF solution with a concentration of 0.3% by weight)

Synthesis Example 1

Here, 100 g of an organohydrogenpolysiloxane represented by the following formula (5) (hydrosilyl group amount: 0.045 mol), 7.4 g of 4-allylpyrocatechol (0.050 mol) and 130 g of toluene were put into a triple-necked flask equipped with a stirrer, a thermometer and a reflux condenser. After performing nitrogen substitution inside the flask, the temperature was raised to 70° C., and 0.10 g of a platinum-1,3-divinyl-1,1,3,3-tetramethyldisiloxane complex (platinum concentration 0.5 wt %) was added to the flask. After confirming that the temperature in the flask had reached 75° C. by heat generation, the temperature was further raised to 80° C., and stirring was performed for an hour. Here, the progress of the reaction was confirmed via $^1$H-NMR, when the peak of hydrosilyl group (4.6 to 4.8 ppm) had disappeared, and a new peak of silethylene group (0.5 to 0.7 ppm) had occurred. Next, the reaction solution was cooled to room temperature, and toluene was distilled away under a reduced pressure, thus obtaining 106 g of a silicone A equivalent to a target catechol functional organopolysiloxane.

[Chemical formula 9]

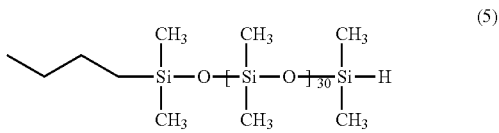

[Chemical formula 10]

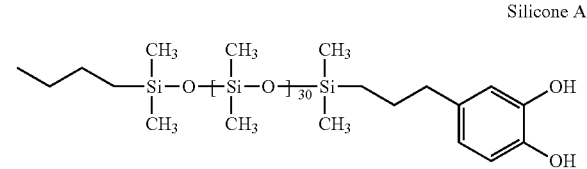

Synthesis Example 2

Here, 100 g of an organohydrogenpolysiloxane represented by the following formula (6) (hydrosilyl group amount: 0.018 mol), 3.0 g of 4-allylpyrocatechol (0.020 mol) and 130 g of toluene were put into a triple-necked flask equipped with a stirrer, a thermometer and a reflux condenser. After performing nitrogen substitution inside the flask, the temperature was raised to 70° C., and 0.10 g of a platinum-1,3-divinyl-1,1,3,3-tetramethyldisiloxane complex (platinum concentration 0.5 wt %) was added to the flask. After confirming that the temperature in the flask had reached 75° C. by heat generation, the temperature was further raised to 80° C., and stirring was performed for an hour. Here, the progress of the reaction was confirmed via $^1$H-NMR in the same manner as the synthesis example 1. Next, the reaction solution was cooled to room temperature, and toluene was distilled away under a reduced pressure, thus obtaining 101 g of a silicone B equivalent to a target catechol functional organopolysiloxane.

[Chemical formula 10]

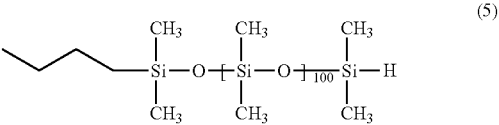

[Chemical formula 12]

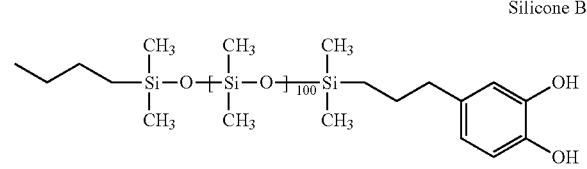

Synthesis Example 3

Here, 100 g of an organohydrogenpolysiloxane represented by the following formula (7) (hydrosilyl group amount: 0.083 mol), 13.6 g of 4-allylpyrocatechol (0.091 mol) and 130 g of toluene were put into a triple-necked flask equipped with a stirrer, a thermometer and a reflux condenser. After performing nitrogen substitution inside the flask, the temperature was raised to 70° C., and 0.10 g of a platinum-1,3-divinyl-1,1,3,3-tetramethyldisiloxane complex (platinum concentration 0.5 wt %) was added to the flask. After confirming that the temperature in the flask had reached 75° C. by heat generation, the temperature was further raised to 80° C., and stirring was performed for an hour. Here, the progress of the reaction was confirmed via $^1$H-NMR in the same manner as the synthesis example 1. Next, the reaction solution was cooled to room temperature, and toluene was distilled away under a reduced pressure, thus obtaining 111 g of a silicone C equivalent to a target catechol functional organopolysiloxane.

[Chemical formula 13]

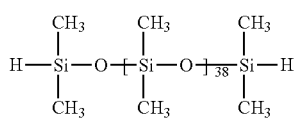

(7)

[Chemical formula 14]

Silicone C

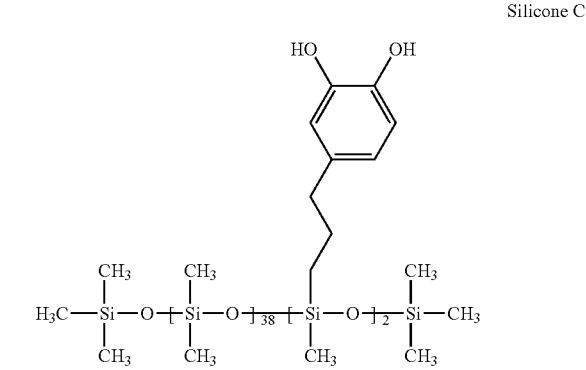

Synthesis Example 4

Here, 100 g of an organohydrogenpolysiloxane represented by the following formula (8) (hydrosilyl group amount: 0.067 mol), 11.1 g of 4-allylpyrocatechol (0.074 mol) and 130 g of toluene were put into a triple-necked flask equipped with a stirrer, a thermometer and a reflux condenser. After performing nitrogen substitution inside the flask, the temperature was raised to 70° C., and 0.10 g of a platinum-1,3-divinyl-1,1,3,3-tetramethyldisiloxane complex (platinum concentration 0.5 wt %) was added to the flask. After confirming that the temperature in the flask had reached 75° C. by heat generation, the temperature was further raised to 80° C., and stirring was performed for an hour. Here, the progress of the reaction was confirmed via $^1$H-NMR in the same manner as the synthesis example 1. Next, the reaction solution was cooled to room temperature, and toluene was distilled away under a reduced pressure, thus obtaining 108 g of a silicone D equivalent to a target catechol functional organopolysiloxane.

[Chemical formula 15]

(8)

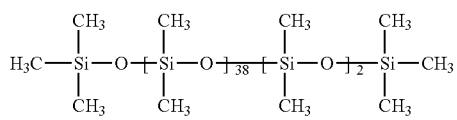

[Chemical formula 16]

Silicone D

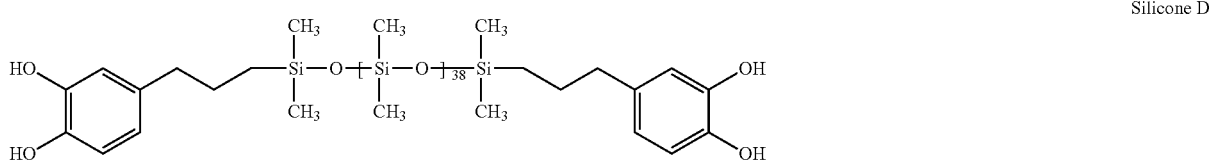

Synthesis Example 5

Here, 200 g of a 50% decamethylcyclopentasiloxane solution of an organohydrogenpolysiloxane represented by the following formula (9) (hydrosilyl group amount: 0.084 mol) and 13.9 g of 4-allylpyrocatechol (0.092 mol) were put into a triple-necked flask equipped with a stirrer, a thermometer and a reflux condenser. After performing nitrogen substitution inside the flask, the temperature was raised to 70° C., and 0.13 g of a platinum-1,3-divinyl-1,1,3,3-tetramethyldisiloxane complex (platinum concentration 0.5 wt %) was added to the flask. After confirming that the temperature in the flask had reached 75° C. by heat generation, the temperature was further raised to 80° C., and stirring was performed for an hour. Here, the progress of the reaction was confirmed via $^1$H-NMR in the same manner as the synthesis example 1. Next, the reaction solution was cooled to room temperature, thus obtaining 210 g of a decamethylcyclopentasiloxane solution of a silicone E equivalent to a target catechol functional organopolysiloxane.

[Chemical formula 17]

(9)

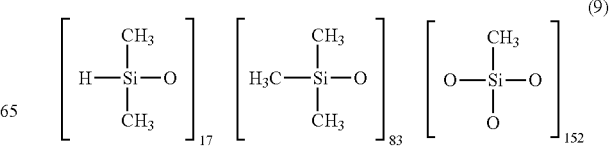

[Chemical formula 18]

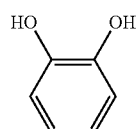
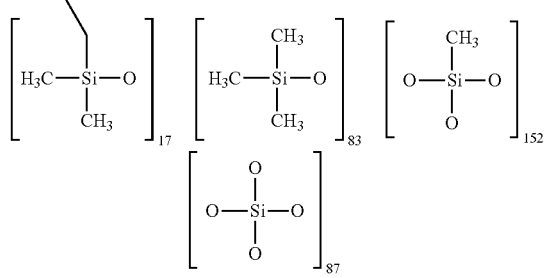

Silicone E

Synthesis Comparative Example 1

Here, 100 g of the organohydrogenpolysiloxane represented by the following formula (5) (hydrosilyl group amount: 0.045 mol), 5.1 g of ethyleneglycol monoallyl ether (0.050 mol) and 52.5 g of isopropyl alcohol were put into a triple-necked flask equipped with a stirrer, a thermometer and a reflux condenser. After performing nitrogen substitution inside the flask, the temperature was raised to 70° C., and 0.06 g of a platinum-1,3-divinyl-1,1,3,3-tetramethyldisiloxane complex (platinum concentration 0.5 wt %) was added to the flask. After confirming that the temperature in the flask had reached 85° C. by heat generation, stirring was further performed at 85° C. for an hour. Here, the progress of the reaction was confirmed via $^1$H-NMR in the same manner as the synthesis example 1. Next, the reaction solution was cooled to room temperature, and the isopropyl alcohol was distilled away under a reduced pressure, thus obtaining 101 g of a silicone F equivalent to a target organopolysiloxane.

[Chemical formula 19]

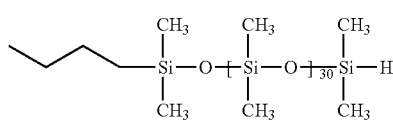

(5)

[Chemical formula 20]

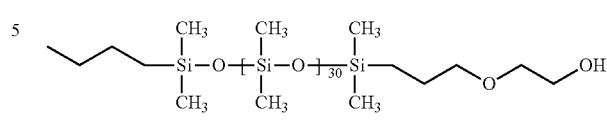

Silicone F

Synthesis Comparative Example 2

Here, 100 g of the organohydrogenpolysiloxane represented by the following formula (5) (hydrosilyl group amount: 0.045 mol), 6.7 g of allylphenol (0.050 mol) and 53.3 g of toluene were put into a triple-necked flask equipped with a stirrer, a thermometer and a reflux condenser. After performing nitrogen substitution inside the flask, the temperature was raised to 70° C., and 0.06 g of a platinum-1,3-divinyl-1,1,3,3-tetramethyldisiloxane complex (platinum concentration 0.5 wt %) was added to the flask. After confirming that the temperature in the flask had reached 85° C. by heat generation, stirring was further performed at 85° C. for an hour. Here, the progress of the reaction was confirmed in the same manner as the synthesis example 1. Next, the reaction solution was cooled to room temperature, and toluene was distilled away under a reduced pressure, thus obtaining 103 g of a silicone G equivalent to a target organopolysiloxane.

[Chemical formula 21]

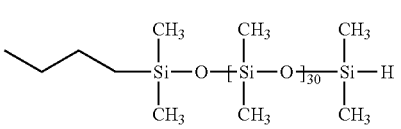

(5)

[Chemical formula 22]

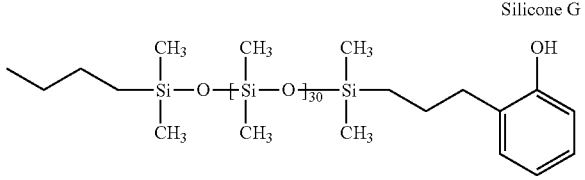

Silicone G

[Dispersibility Evaluation]

Dispersibility evaluation was performed using each silicone obtained in the synthesis and synthesis comparative examples. A slurry was prepared at the compositional ratio (s) shown in Table 1, using a bead mill; and a B-type rotary viscometer was then used to measure the viscosity of such slurry at 25° C. by a method described in JIS K 7117-1:1999, immediately after the preparation of the slurry, and then after storing the slurry at 50° C. for seven days. The unit was mPa·s.

TABLE 1

| | Working example 1 | Working example 2 | Working example 3 | Working example 4 | Working example 5 | Comparative example 1 | Comparative example 2 |
|---|---|---|---|---|---|---|---|
| Silicone A | 10 | | | | | | |
| Silicone B | | 10 | | | | | |
| Silicone C | | | 10 | | | | |

TABLE 1-continued

|  |  | Working example 1 | Working example 2 | Working example 3 | Working example 4 | Working example 5 | Comparative example 1 | Comparative example 2 |
|---|---|---|---|---|---|---|---|---|
| Silicone D |  |  |  |  | 10 |  |  |  |
| Silicone E |  |  |  |  |  | 20 |  |  |
| Silicone F |  |  |  |  |  |  | 10 |  |
| Silicone G |  |  |  |  |  |  |  | 10 |
| Fine particle titanium oxide * |  | 40 | 40 | 40 | 40 | 40 | 40 | 40 |
| Decamethylcyclopentasiloxane |  | 50 | 50 | 50 | 50 | 40 | 50 | 50 |
| Viscosity (25° C.) [mPa · s] | Immediately after preparation | 85 | 93 | 89 | 115 | 270 | 73 | No fluidity observed |
|  | 50° C./ 7 days later | 81 | 92 | 86 | 116 | 282 | No fluidity observed | No fluidity observed |

* MTR07 (by TAYCA CORPORATION)

As is clear from the results shown in Table 1, the catechol functional organopolysiloxane of the present invention can be used to produce a low-viscosity dispersion with a higher dispersibility and a more excellent preservation stability as compared to when using an alcoholic hydroxyl group-containing organopolysiloxane or a phenolic hydroxyl group-containing organopolysiloxane.

[Evaluation as Sunscreening Agent]

Using each silicone obtained in the synthesis and synthesis comparative examples, a sunscreening agent was prepared at the compositional ratio(s) shown in Table 2 by the following procedure; the quality of the sunscreening agent was then evaluated.

Preparation Method of Sunscreening Agent (Step 1) Components (a) to (d) are uniformly mixed with a disperser.

(Step 2) Separately from the step 1, components (f) to (h) are uniformly mixed with a disperser.

(Step 3) The mixture produced in the step 2 is added to the mixture produced in the step 1, and a disperser is then used to emulsify the mixtures.

(Step 4) Components (e) and (i) are added to the emulsion produced in the step 3, and a disperser is then used to uniformly mix them to obtain a sunscreening agent.

The quality evaluation of each sunscreening agent was performed as follows; the results thereof are shown in Table 2.

1. Dispersion Stability

After leaving the sunscreening agent prepared by the above procedure to stand at room temperature for a month, the agglomerating property of the powder was examined, and evaluation was conducted under the following criteria.

⊚: Agglomeration of the powder was not observed.
○: Agglomeration of the powder was slightly observed.
Δ: Agglomeration tendency of the powder was observed.

2. Evaluation of Feeling of Use

Here, 50 randomly picked women evaluated the sunscreening agent prepared by the above procedure from the perspectives of smoothness, extensibility and sunscreening effect based on the following three-level criteria, and presented a mean value(s) thereof.

⊚: Very good
○: Good
Δ: Slightly bad

TABLE 2

|  |  | Working example 6 | Working example 7 | Working example 8 | Working example 9 | Working example 10 | Comparative example 3 | Comparative example 4 |
|---|---|---|---|---|---|---|---|---|
| (a) | KF-96-6cs | 5 | 5 | 5 | 5 | 5 | 5 | 5 |
| (b) | KSG-21 | 5 | 5 | 5 | 5 | 5 | 5 | 5 |
| (c) | Glyceryl triisooctanoate | 3 | 3 | 3 | 3 | 3 | 3 | 3 |
| (d) | KF-6017 | 1 | 1 | 1 | 1 | 1 | 1 | 1 |
| (e) | Octyl methoxycinnamate | 6 | 6 | 6 | 6 | 6 | 6 | 6 |
| (f) | Sodium chloride | 0.5 | 0.5 | 0.5 | 0.5 | 0.5 | 0.5 | 0.5 |
| (g) | 1,3-butyleneglycol | 2 | 2 | 2 | 2 | 2 | 2 | 2 |
| (h) | Purified water | 27.5 | 27.5 | 27.5 | 27.5 | 27.5 | 27.5 | 27.5 |
| (i) | Titanium oxide dispersion (Working example 1) | 50 |  |  |  |  |  |  |
|  | Titanium oxide dispersion (Working example 2) |  | 50 |  |  |  |  |  |
|  | Titanium oxide dispersion (Working example 3) |  |  | 50 |  |  |  |  |
|  | Titanium oxide dispersion (Working example 4) |  |  |  | 50 |  |  |  |
|  | Titanium oxide dispersion (Working example 5) |  |  |  |  | 50 |  |  |
|  | Titanium oxide dispersion (Comparative example 1) |  |  |  |  |  | 50 |  |
|  | Titanium oxide dispersion (Comparative example 2) |  |  |  |  |  |  | 50 |

TABLE 2-continued

| | | Working example 6 | Working example 7 | Working example 8 | Working example 9 | Working example 10 | Comparative example 3 | Comparative example 4 |
|---|---|---|---|---|---|---|---|---|
| Evaluation results | Dispersion stability | ◎ | ◎ | ◎ | ◎ | ◎ | Δ | Δ |
| | Smoothness | ◎ | ◎ | ◎ | ◎ | ○ | ○ | ○ |
| | Extensibility | ◎ | ◎ | ◎ | ○ | ○ | Δ | Δ |
| | Sunscreening effect | ◎ | ◎ | ◎ | ◎ | ◎ | ○ | ○ |

(a) KF-96-6cs: Dimethylpolysiloxane having a kinetic viscosity of 6 mm²/s (6 cSt) at 25° C. (by Shin-Etsu Chemical Co., Ltd.)
(b) KSG-21: Crosspolymer of dimethylpolysiloxane and polyethylene glycol (by Shin-Etsu Chemical Co., Ltd.)
(d) KF-6017: Polyether-modified silicone surfactant (HLB: 4.5, by Shin-Etsu Chemical Co., Ltd.)

As is clear from the results shown in Table 2, the dispersion produced using the catechol functional organopolysiloxane of the present invention exhibited no powder agglomeration, was thus superior in dispersibility, and even provided a favorable feeling of use.

The invention claimed is:

1. A dispersion comprising:
   a powder;
   a powder treatment agent comprising a catechol functional organopolysiloxane represented by the following formula (1):

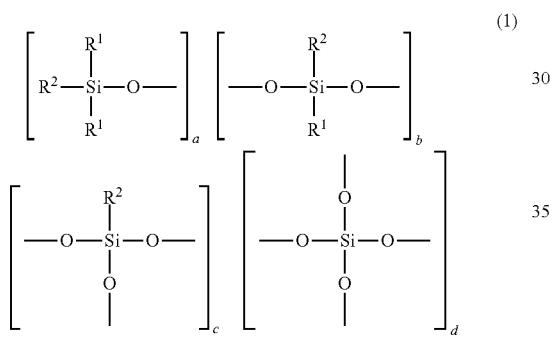

wherein each $R^1$ independently represents a substituted or unsubstituted monovalent hydrocarbon group having 1 to 6 carbon atoms; each $R^2$ independently represents a substituted or unsubstituted monovalent hydrocarbon group having 1 to 6 carbon atoms, or a substituent group represented by a formula (2); a, b, c and d each represent 0 or a positive number, and satisfy a+b+c+d=2 to 1,000; in each molecule, at least one $R^2$ is the substituent group represented by the formula (2); and oxygen atom(s) in each repeating unit are shared with the rest of the repeating units, the formula (2) being expressed as:

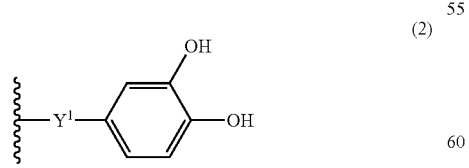

wherein Y represents a substituted or unsubstituted divalent hydrocarbon group having 2 to 6 carbon atoms; and a bond delimited by a wavy line is to be bonded to a silicon atom in the formula (1); and
an oil agent,
wherein said powder and said powder treatment agent are dispersed in said oil agent.

2. A cosmetic material composition comprising the dispersion according to claim 1.

3. The dispersion according to claim 1, wherein the powder is an inorganic powder.

4. A treated powder comprising:
   a powder; and
   a powder treatment agent comprising a catechol functional organopolysiloxane represented by the following formula (1):

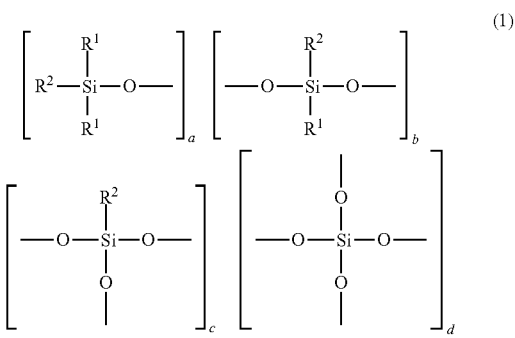

wherein each $R^1$ independently represents a substituted or unsubstituted monovalent hydrocarbon group having 1 to 6 carbon atoms; each $R^2$ independently represents a substituted or unsubstituted monovalent hydrocarbon group having 1 to 6 carbon atoms, or a substituent group represented by a formula (2); a, b, c and d each represent 0 or a positive number, and satisfy a+b+c+d=2 to 1,000; in each molecule, at least one $R^2$ is the substituent group represented by the formula (2); and oxygen atom(s) in each repeating unit are shared with the rest of the repeating units, the formula (2) being expressed as:

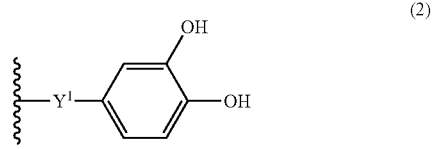

wherein Y represents a substituted or unsubstituted divalent hydrocarbon group having 2 to 6 carbon atoms; and a bond delimited by a wavy line is to be bonded to a silicon atom in the formula (1),
wherein said powder is treated with said powder treating agent.

5. The treated powder according to claim 4, wherein the surface of said powder is treated with the powder treatment agent.

6. The treated powder according to claim 4, wherein this powder treatment agent is used in an amount of 0.1 to 30 parts by mass, per 100 parts by mass of the powder.

7. The treated powder according to claim 4, wherein this powder treatment agent is used in an amount of 0.5 to 10 parts by mass, per 100 parts by mass of the powder.

8. The dispersion according to claim 1, wherein this powder treatment agent is used in an amount of 0.1 to 30 parts by mass, per 100 parts by mass of the powder.

9. The dispersion according to claim 1, wherein this powder treatment agent is used in an amount of 0.5 to 10 parts by mass, per 100 parts by mass of the powder.

10. The treated powder according to claim 4, wherein in the formula (1), a=2, b=0 to 1,000, c=0, and d=0.

11. The treated powder according to claim 4, wherein the powder is an inorganic powder.

12. The dispersion according to claim 1, which is a sunscreening agent.

13. The dispersion according to claim 3, which is a sunscreening agent.

14. The dispersion according to claim 1, wherein said oil agent comprises a silicone oil.

\* \* \* \* \*